T. S. BROWN.
Harvester Rake.
No. 81,473. Patented Aug. 25, 1868.
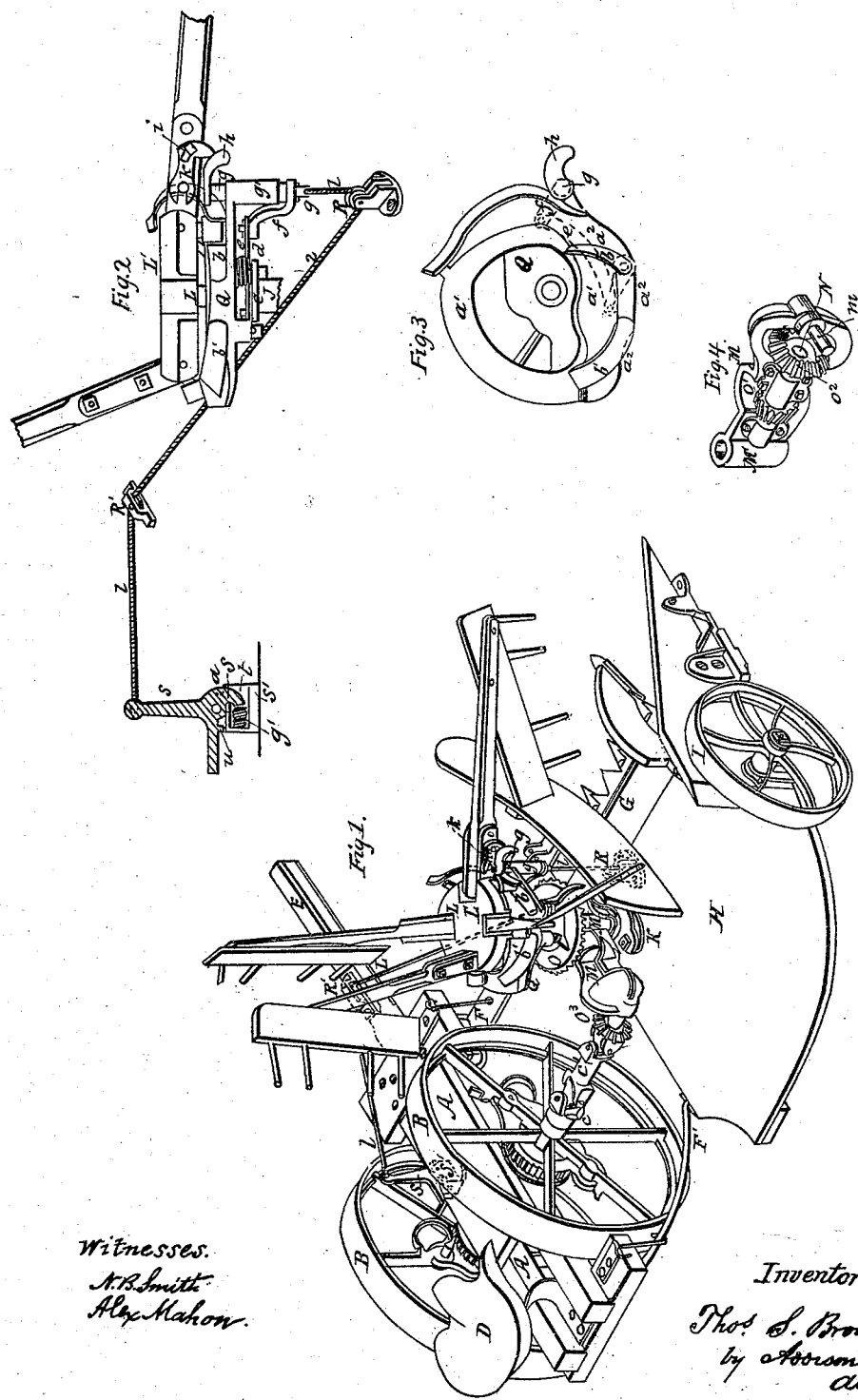

UNITED STATES PATENT OFFICE.

THOMAS S. BROWN, OF POUGHKEEPSIE, NEW YORK.

IMPROVEMENT IN HARVESTER-RAKES.

Specification forming part of Letters Patent No. 81,473, dated August 25, 1868.

*To all whom it may concern:*

Be it known that I, THOMAS S. BROWN, of Poughkeepsie, county of Dutchess and State of New York, have invented a new and useful Improvement in Automatic Rakes for Harvesters; and I do hereby declare that the following is a full, clear, and exact description of the same, reference being had to the accompanying drawings, making a part of this specification, in which—

Figure 1 is a perspective view of a harvesting-machine having my improvement applied, taken from the rear grain-corner of the machine, and having the outer grain-guard removed, in part, for the purpose of more clearly showing the arrangement of parts. Fig. 2 is a side elevation of the cam-ring, rake-head, and the switch-actuating devices detached from the machine. Fig. 3 is a plan view of the cam-track, which controls the movement of the revolving rake and reel arms, showing the movable gate or switch and the arrangement of levers for operating the same; and Fig. 4 is a side elevation of the swinging gear-frame, which carries the rake-driving mechanism.

Similar letters of reference denote the same parts in all the figures.

My invention relates to a novel arrangement of mechanism for driving and for controlling the movements of the arms of a revolving rake and reel, whereby said rake and reel are adapted to conform to all the movements of the hinged platform and cutting apparatus, and at the same time are placed under perfect control of the driver in any and all positions that the platform and cutting apparatus may assume in conforming to the uneven surface of the ground over which they are drawn.

In the accompanying drawings, A represents a main frame; B B, the main carrying and driving wheels, mounted on a common axle, C, and secured thereto by backing-ratchets; D, the driver's seat; E, the tongue; F F', coupling arms, through which the finger-bar G and platform H are hinged to the frame A. The outer end of the platform and cutting apparatus are supported by a carrying or grain wheel, I, applied in any usual manner. J is a rake-stand or yoke, mounted on the inner front corner of the platform or on the heel extension K of the shoe. Said stand or yoke affords bearings for the upright rake-shaft L, to the upper end of which the rotating head L', which carries the rake and reel arms, is secured. M is a swinging gear-box or frame, armed at one end with a vertical sleeve, M', which embraces the upright shaft L, and is free to vibrate horizontally thereon or on tubular bearings thereof formed on the yoke or stand J. Said frame is provided with suitable bearings, in which is mounted a horizontal shaft, N, armed at each end with a bevel-wheel, one of which, $O^1$, engages with and drives the crown or bevel wheel O on the upright rake-shaft, the other, $O^2$, engaging with and being driven by a bevel wheel, $O^3$, as represented in Fig. 1.

The wheel $O^3$ is mounted on a stud-shaft or pin, $m$, formed on or attached to the swinging gear-frame M, and is provided with lugs or ears on its outer face, to which a tumbling-shaft or link-extension, $C^1$, of the main axle C or main driving-shaft is connected by a universal joint, the other end of said link or shaft $C^1$ being directly connected by a similar joint with the main drive-wheel axle C. By this arrangement of rake-driving mechanism, consisting of the double-jointed tumbling-shaft or link and the bevel-gears on the swinging frame and rake-shaft, the usual extensible connection for driving the rake and reel on the hinged platform is dispensed with, while at the same time the cutting apparatus and platform are left free to follow the surface of the ground at either end without obstruction therefrom, and without interfering with the movement of the rake and reel.

Q is the cam-ring, by means of which the necessary rising and falling movements of the rake and reel arms in gathering the grain into the cutters, discharging the same from the platform, and in passing the main frame, are given and controlled. Said cam is attached to the top of the rake-stand or yoke, and is provided, on the side adjacent to the platform, with a double track, one portion of which is pursued by the arms, which merely gather the grain to the cutters and deposit it upon the platform, and is shown at $a^2$; the other, $a^1$, forming the track pursued by those arms, which not only gather the grain to the cutters and platform, but serve to discharge the grain from the platform and upon the ground. $b$ is a gate or switch, the position of which serves to determine the path of the arms in passing the platform. Said switch is provided at its heel or rear end with a vertical shank or pivot, which passes through an eye-bearing in the cam-ring or plate, and has one end of an arm or lever, $c$, attached to its lower end, by the movement of which the switch $b$ is operated, and the track $a^1$ opened or closed to the passage of the friction-roller on the elbow or heel of the rake and reel arms, as desired. A spring, $d$, attached to the cam-plate and acting on the arm or lever $c$ or switch $b$, serves to keep the track $a^1$ closed, except when said switch is operated upon by other devices hereinafter described.

A switch, $b'$, at the rear or opposite end of the partial track $a^2$, similar to switch $b$, serves to return the rollers on the elbow of the rake-arms to the main or common track $a$. The swinging end of switch-lever $c$ has one end of a link, $e$, connected to it, the opposite end of said link being connected to the swinging end of an arm or lever, $f$, which at its opposite end is attached to the lower end of a vertically-sliding rock-shaft or pivot, $g$, mounted in a tubular arm or bearing, $g'$, formed upon or attached to the cam-plate Q. The pivot or shaft $g$ is maintained at its highest point of elevation by means of a spring of any suitable construction, arranged within the bearing $g$, or in any convenient position for the purpose, or a weighted lever may be used instead of the spring, if preferred. $h$ is an arm or lever attached to the upper end of shaft $g$, by the movement or vibration of which, through the arrangement of levers and links described, the switch is opened when desired, and which, therefore, by way of distinction, I denominate the "switch-lever." Said lever is curved outward and rearward, as shown in Fig. 3, and is inclined downward from its shaft to its rear or outer end, as shown in Figs. 1 and 2. $k$ is a hook or spur bolted or otherwise secured to the rake arm or arms, and made adjustable thereon by means of the slot and set-screw shown at $i$. The arrangement of said hook or spur on the rake-arm is such as to cause it to catch or strike the switch-lever as the arm rotates, and to vibrate or move the same backward, thereby, through the arrangement of connecting devices above described, opening the switch and permitting the rollers on the heel end of said rake-arm to enter the track $a^1$, and causing the rake-head to act upon the grain on the platform to remove the same therefrom. The spring $d$, before described, acts upon the switch $b$ after the roller has passed by it, closing the same and causing the succeeding arm or arms to pursue the outer track $a^2$.

To the lower end of the vertical sliding shaft $g$ is attached one end of a cord, $l$, which passes underneath a guiding sheave or pulley, R, attached to the platform in the plane, or nearly so, with the hinge which connects the cutting apparatus with the coupling-arm, thence over a horizontal pulley, R', on the tongue or main frame to a bent lever, S, mounted on the main frame within convenient reach of the driver, on seat D.

The construction of lever S is represented in the side elevation and sectional view, Fig. 2, said lever being made in an angular or bell-crank form, and pivoted in suitable lugs or ears formed on a tubular box, S'. An arm, $s$, formed on said lever extends within a chamber, $t$, in the box, and is surrounded by or connected with a suitable spring, $s'$, the tension of which acts upon the lever to cause it to take up any slack in the cord $v$ due to the varying relation of the parts caused by the movement of the platform in conforming to the surface of the ground over which it is drawn. The lever S is provided with stops $u$, one on each side of the pivot or fulcrum, which serve to limit the throw of the lever and prevent injury to or displacement of the switch-lever spring or spring $s$, in a manner that will be readily understood.

By this arrangement of levers and cords in connection with the switch-lever, the sliding shaft $g$, to which the switch-lever is attached, may be drawn downward by the pressure of the driver's foot upon the treadle end of lever S, in such manner as to remove the switch-lever out of reach of the hook or spur on the rake-arm, thereby preventing the action of said hook or spur on the switch for opening the same, and allowing the rake-arm to rise out of the grain after it has passed the cutters, and to act merely as a reel-beater or gathering-arm. The switch $b$, therefore, without being opened directly by the lever and cord in the usual manner, is placed under control of the driver, who may at will cause the rake-arms to act as gathering-arms only, when the nature of the crop requires it.

I have described but one of the rake and reel arms as having the switch-actuating hook or spur $k$ applied, but it will be evident that it may be applied to more than one or to all of said arms if desired, in which case all such arms would act automatically as rake-arms, without the intervention of the driver's foot. Where all the arms are provided with said actuating-hooks, the foot of the driver rests upon the treadle-lever S, keeping the switch-lever depressed, and causing all the arms to act as gathering-arms only, until a sufficient amount of grain has accumulated upon the platform to form a sheaf or gavel, when the driver, by removing his foot, releases the switch-lever, which is acted upon by the succeeding arm and opens the switch or track $a^1$, causing said arm to act as a rake-arm and to sweep the grain off the platform and upon the ground behind the machine, and out of the way of the team and machine on the next round.

Heretofore the switch, which causes the rake-arms to operate either as reel and rake arms or as reel-arms only, has been operated upon directly by the driver, who was liable to open the switch only partially, in which case the rollers upon the rake-arm would come in contact with it, rendering the machine liable to be broken; or it could be set to operate automatically, but in this case the rakes would lay the sheaves off at the corners of a piece of grain, in the way of the horses and machine, so that on the next round the grain would be kicked about the field or trodden into the ground, causing great waste.

In my invention the rakes are operated automatically, so that the switch is certain and perfect in its operation, but by a slight pressure of the driver's foot upon the foot-lever, as explained, the switch-lever is pulled down out of the way of the hooks or spurs on the rake-arms, thereby causing said arms to act as gathering-arms only.

I have described my improvement as applied to a front-cut machine, but it will be apparent that the several parts are equally well adapted to a rear cut, and the change may be readily effected by arranging the swinging gear-box in front instead of behind the rake-stand and shaft, so as to connect the same with the axle by means of the tumbling-shaft. The manner of effecting the necessary changes in the other parts of the machine will be readily understood.

What I claim as new, and desire to secure by Letters Patent, is—

1. A swinging gear frame or box, mounted upon and vibrating horizontally about the vertical rake and reel shaft, substantially as described.

2. The horizontal driving-shaft, mounted in a swinging gear-frame, whose axis of vibration is the vertical rake-shaft.

3. The combination of a swinging gear-frame with its gearing and a double-jointed tumbling-shaft, by the use of which the usual extensible tumbling-shaft is dispensed with, substantially as described.

4. The vertically-adjustable switch-lever, for the purpose described.

5. The adjustable switch-lever, in combination with an adjustable hook or spur on the revolving rake-arm or rake-head, for actuating said switch-lever, as described.

6. A movable switch-lever, in combination with means for removing said lever out of the way of the actuating hooks or spurs on the rake-arms or rake-head.

7. Operating the switch-lever by means of a spring or equivalent device, and a hand or foot lever within reach of the driver, on his seat on the machine, so that said switch-lever may be made to engage the hooks or spurs on the rake arms or not, at pleasure.

8. The combination of the switch-lever, spring or weighted lever, and foot or hand lever, substantially as described.

9. Attaching the adjustable hook or stop to the iron roller-cheek or elbow, so that an adjustment of the angle of the rake-arm relative thereto will not disturb the relation of said hook to the switch-lever.

10. The arrangement of the pulley R, over which the cord for actuating the switch-lever passes, in the same or nearly the same plane with the joints which connect the platform with the machine.

11. Giving to the switch-lever an inclination backward from its shaft, substantially as described, so that in case of a backward movement of the rake-arms, the hooks or stops thereon will press said lever downward and pass over it without injury thereto.

12. The foot-lever, provided with the stops or shoulders and spring, operating substantially as and for the purpose described

THOS. S. BROWN.

Witnesses:
ROBT. N. PALMER,
E. Q. ELDRIDGE.